United States Patent
Gauthier et al.

(10) Patent No.: US 6,480,929 B1
(45) Date of Patent: Nov. 12, 2002

(54) PSEUDO-CONCURRENCY BETWEEN A VOLATILE MEMORY AND A NON-VOLATILE MEMORY ON A SAME DATA BUS

(75) Inventors: Lloyd W. Gauthier, Austin, TX (US); Jim Mergard, Austin, TX (US); Gary M. Godfrey, Austin, TX (US); Richard G. Russell, Austin, TX (US)

(73) Assignee: Advanced Micro Devices Inc., Sunnyvale, CA (US)

( * ) Notice: Subject to any disclaimer, the term of this patent is extended or adjusted under 35 U.S.C. 154(b) by 0 days.

(21) Appl. No.: 09/184,270

(22) Filed: Oct. 31, 1998

(51) Int. Cl.[7] .............................................. G06F 12/00
(52) U.S. Cl. ................... 711/105; 711/103; 711/154; 711/168; 710/313; 365/185.08
(58) Field of Search ................................ 711/154, 168, 711/102–105; 365/185.08; 710/313

(56) References Cited

U.S. PATENT DOCUMENTS

| | | | | |
|---|---|---|---|---|
| 3,906,457 A | * | 9/1975 | Mattedi et al. ................. 705/16 |
| 4,818,932 A | | 4/1989 | Odenheimer ............ 324/121 R |
| 4,847,758 A | * | 7/1989 | Olson et al. ................. 711/133 |
| 4,961,172 A | * | 10/1990 | Shubat et al. .......... 365/230.06 |
| 5,001,671 A | | 3/1991 | Koo et al. .............. 365/230.05 |
| 5,226,010 A | | 7/1993 | Glider et al. .......... 365/189.04 |
| 5,386,579 A | | 1/1995 | Bourekas et al. ........... 395/800 |
| 5,404,464 A | | 4/1995 | Bennett ....................... 395/325 |
| 5,606,714 A | * | 2/1997 | Intrater et al. ................. 712/43 |
| 5,652,847 A | | 7/1997 | Padwekar ................... 395/306 |
| 5,655,142 A | | 8/1997 | Gephardt et al. ....... 395/800.32 |
| 5,664,140 A | | 9/1997 | Klein .......................... 711/211 |
| 5,680,567 A | | 10/1997 | Dent ....................... 395/421.1 |
| 5,682,498 A | | 10/1997 | Harness ....................... 395/433 |
| 5,813,038 A | * | 9/1998 | Thome et al. ............... 711/154 |
| 6,026,466 A | * | 2/2000 | Su et al. ...................... 711/105 |
| 6,209,049 B1 | * | 3/2001 | Usami .......................... 710/66 |

\* cited by examiner

*Primary Examiner*—Do Hyun Yoo
*Assistant Examiner*—Mehdi Namazi
(74) *Attorney, Agent, or Firm*—Akin Gump Strauss Hauer & Feld LLP (57) ABSTRACT

A system provides pseudo-concurrency for a volatile memory and a non-volatile memory on a same data bus. In one system embodiment, the volatile memory is coupled to its own address bus, and the non-volatile memory is coupled to its own address bus. In another system embodiment, the volatile memory and non-volatile memory are coupled to a multiplexed address bus. Concurrent with an access cycle to the volatile memory, the non-volatile memory may be precharged. After the access cycle to the volatile memory, a data cycle to a non-volatile memory may be executed. Concurrent with an access cycle to the non-volatile memory, the volatile memory may be precharged. After the access cycle to the non-volatile memory, a data cycle to the volatile memory may be executed.

20 Claims, 4 Drawing Sheets

PSEUDO-CONCURRENCY BETWEEN A VOLATILE MEMORY AND A NON-VOLATILE MEMORY ON A SAME DATA BUS

BACKGROUND OF THE INVENTION

1. Field of the Invention

The present invention relates to memory architecture and access protocol for processor-oriented systems and more particularly, to pseudo-concurrency between a volatile memory and a non-volatile memory on a same data bus.

2. Description of the Related Art

Memory has long been an essential component of computing systems. Transfer rates provided by memory do not always keep up with system requirements for high-performance computing systems. In an effort to accommodate the increasing speeds of processors of high-performance computing systems, various levels of memory hierarchies are typically provided. As an example, near a high-speed processor of a computing system, a small amount of fast memory is usually provided. Downstream of fast memory, a larger and slower memory has been provided. It is not unusual for a computing system capable of high processor speeds to support multiple levels of cache memory and multiple levels of main memory. These memory levels are commonly populated by different types of memories.

A memory may generally be classified as either a volatile memory or a non-volatile memory. An example of a volatile memory is dynamic random access memory (DRAM), and an example of non-volatile memory is read only memory (ROM) or flash memory. Volatile memory and non-volatile memory have served different needs within a computing system. While the contents of a volatile memory are stored until power is turned off to a computing system, a non-volatile memory maintains its contents when power is turned off to a computing system. Volatile memory has generally been capable of greater memory speeds than non-volatile memory. Volatile memory and non-volatile memory, thus, commonly occupy different memory levels in a memory hierarchy.

For high-performance processor-oriented systems providing volatile memory and non-volatile memory, non-volatile memory and volatile memory have traditionally been supported on separate data buses. Typically, the volatile memory is coupled to a relatively fast data bus, and the non-volatile memory is coupled to a relatively slow data bus downstream of the relatively fast data bus. By providing a non-volatile memory and volatile memory on separate data buses, the data cycle of the non-volatile memory and the data cycle of the volatile memory are independent of each other. In this way, the data cycle of the non-volatile memory may be concurrent with the data cycle of the volatile memory.

A drawback of this memory architecture, however, has been relegating non-volatile memory to a relatively slow bus of a system. This architectural. constraint is particularly significant in a microcontroller environment. While in a computer system environment, most memory accesses are to a volatile memory, in a microcontroller environment, a significant number of memory accesses are to a non-volatile memory. In a computer system environment, code initially stored in a non-volatile memory is typically copied to a volatile memory and executed out of the volatile memory. In a microcontroller environment, however, code (e.g., eXecute-In-Place or XIP code) stored in a non-volatile memory is typically executed out of the non-volatile memory given the small amount of volatile memory available. Memory accesses to a volatile memory are undesirably slowed by the relatively slow speed of the bus supporting the non-volatile memory. Yet, in order to avoid bus latency attendant with supporting a volatile memory and non-volatile memory on a same data bus, many systems continue to provide the volatile memory on the relatively slow bus that supports the non-volatile memory.

For systems providing volatile memory and non-volatile memory on a same data bus, it is understood that during an access to either memory device, the other memory device generally must wait for completion of that access. This form of bus latency has long been perceived as a necessary cost of supporting volatile memory and non-volatile memory on a same data bus.

SUMMARY OF THE INVENTION

Briefly, a system and method according to the present invention operates a volatile memory and a non-volatile memory on a same data bus with pseudo-concurrency. Both the volatile memory and non-volatile memory share the data bus. Pseudo-concurrency is achieved by adjusting the timing of the address and control buses for the volatile memory and non-volatile memory so that data for the volatile memory and non-volatile memory are driven at the appropriate times.

In one disclosed embodiment, the volatile memory is further coupled to a first address bus, and the non-volatile memory is further coupled to a second address bus. The volatile memory may also be coupled to a first control bus, and the non-volatile memory may be coupled to a second control bus. The system may comprise a bus master coupled to the data bus, the first address bus, and the second address bus. The bus master may execute an access cycle to the volatile memory and concurrently precharge the non-volatile memory. The bus master may execute a data cycle to the non-volatile memory after executing an access cycle to the volatile memory. The bus master may also execute an access cycle to the non-volatile memory and concurrently precharge the volatile memory. The bus master may execute a data cycle to the volatile memory after executing an access cycle to the non-volatile memory.

In another disclosed embodiment, a volatile memory and a non-volatile memory are coupled to a multiplexed address bus. The system may comprise a bus master coupled to the data bus and multiplexed address bus. The bus master may execute an access cycle to the volatile memory and concurrently precharge the non-volatile memory. The bus master may execute a data cycle to the non-volatile memory after executing an access cycle to the volatile memory. The bus master may also execute an access cycle to the non-volatile memory and concurrently precharge the volatile memory. The bus master may execute a data cycle to the volatile memory after executing an access cycle to the non-volatile memory.

In accordance with the present invention, a non-volatile memory may be supported by a relatively fast bus, as opposed to a relatively slow bus. Further, the non-volatile memory and volatile memory may share signal pins coupled to the data bus, permitting a reduction in the number of signal pins for the system.

BRIEF DESCRIPTION OF THE DRAWINGS

A better understanding of the present invention can be obtained when the following detailed description of the invention is considered in conjunction with the following drawings, in which.

DETAILED DESCRIPTION OF INVENTION

Figure 1:
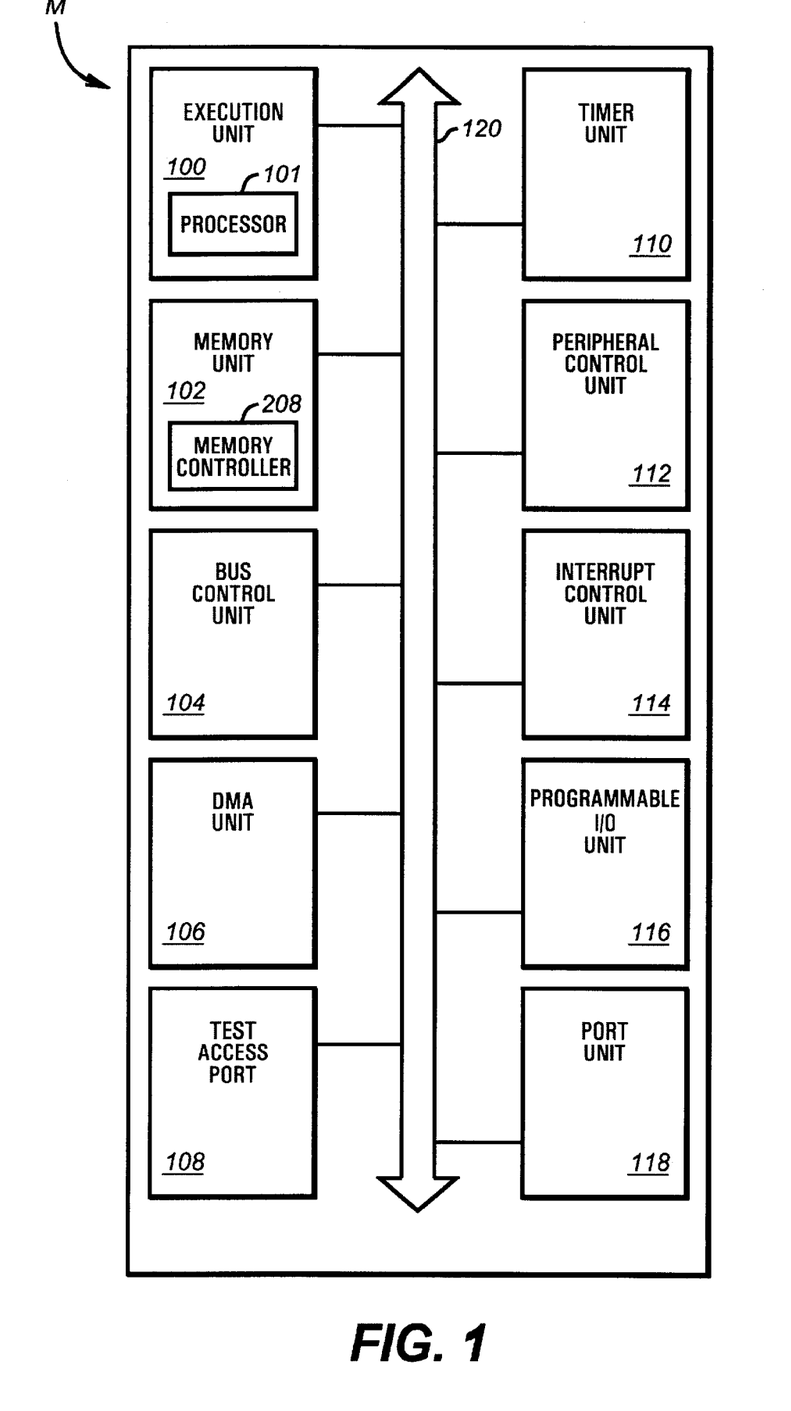
FIG. 1 is a block diagram of a microcontroller.

Turning now to the drawings, FIG. 1 shows a block diagram of an exemplary architecture for a microcontroller M in accordance with the present invention. The microcontroller M may support a variety of on-chip units. In the illustrated architecture, an execution unit 100, a memory unit 102, a bus control unit 104, a direct memory access (DMA) unit 106, a test access port 108, a scalable virtual timer unit 110, a peripheral control unit 112, an interrupt control unit 114, a programmable I/O unit 116, and a port unit 118 are each coupled to a system bus 120. The system bus 120 may include a data bus, address bus, and control bus for communicating data, addresses and control information between any of these coupled units.

The execution unit 100 may provide a highly integrated processor 101 for executing code stored by the memory unit 102. The execution unit 100 in the disclosed embodiment is compatible with the Am 186 instruction set implemented in a variety of microcontrollers from Advanced Micro Devices, Inc. of Sunnyvale, Calif. A variety of other execution units could be used instead of the execution unit 100.

The memory unit 102, which includes a memory controller 208, may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and/or synchronous DRAM (SDRAM) support, write buffering support, and read-ahead buffering support.

The bus control unit 104 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. The bus control unit 104 thus permits the microcontroller M to support a number of external buses and peripherals.

The DMA unit 106 may provide multiple DMA controllers having several DMA channels for controlling direct memory access transfers between the units of the microcontroller M. The test access port 108 provides a scan interface for testing the microcontroller M in a production environment and supports a test access port (TAP) controller for controlling test logic of the port 108.

The peripheral control unit 112 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards.

The interrupt control unit 114 may provide multiple interrupt controllers for supporting several interrupt requests. Each interrupt controller may regulate issuance and acceptance of its associated interrupt requests. The programmable I/O unit 116 supports several general-purpose I/O pins. These pins provide a parallel interface for external devices to the microcontroller M. The port unit 118 may provide a standard parallel port interface, serial port interface, and/or infrared port interface. The parallel port interface may support an enhanced parallel port (EPP) mode for high-speed transfers. The serial port interface and infrared interface may be driven by an industry-standard universal asynchronous receiver/transmitter (UART) so as to permit PC compatibility.

A variety of configurations and combinations of these units of the microcontroller M are possible. The microcontroller M, for example, could be the Am186™ ED microcontroller, the Elan™ SC400 microcontroller, or the Am186™ CC microcontroller. It should be understood that the disclosed units are illustrative and not exhaustive. A number of the illustrated units could be eliminated, or added to, without detracting from the spirit of the invention. Further, selection of the particular units supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2A:
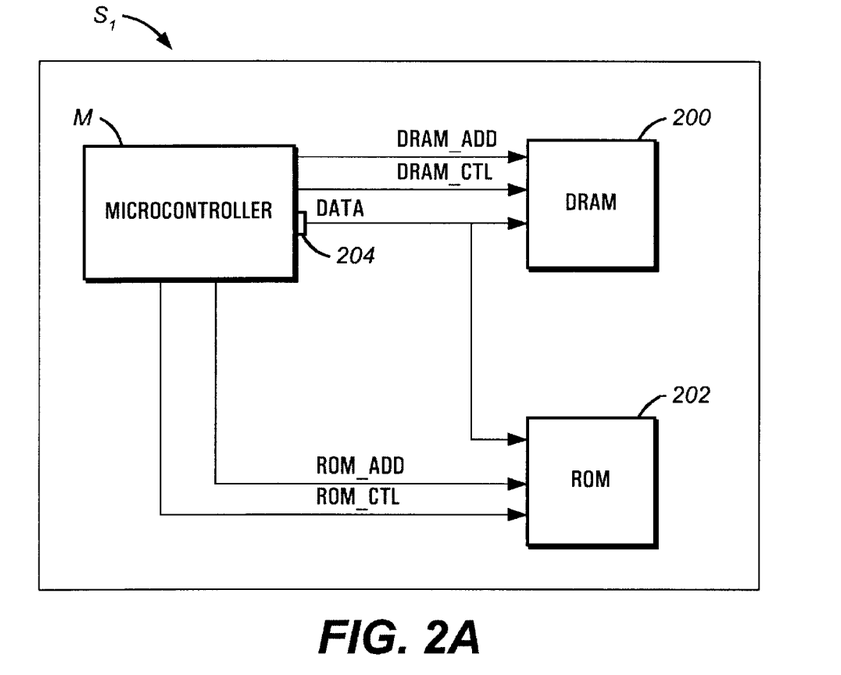
FIG. 2A is a schematic diagram of an exemplary system including the microcontroller of FIG. 1, a dynamic random access memory (DRAM), read only memory (ROM) and separate memory address buses in accordance with the present invention.

Referring to FIG. 2A, an exemplary system $S_1$ in accordance with the present invention is shown. The system $S_1$ includes a microcontroller M such as described in FIG. 1, a dynamic random access memory (DRAM) 200 or other volatile memory, and a read only memory (ROM) 202 or other non-volatile memory. The microcontroller M controls access to the DRAM 200 and the ROM 202. The DRAM 200 and ROM 202 share a data bus DATA coupled to the microcontroller M. The microcontroller M is coupled to the data bus DATA through signal pins 204 shared by the DRAM 200 and ROM 202. For a DRAM access cycle, data transfer occurs over the data bus DATA between the microcontroller M and the DRAM 200. For a ROM access cycle, data transfer occurs over the data bus DATA between the microcontroller M and the ROM 202. Since access to the DRAM 200 over the data bus DATA is mutually exclusive with access to the ROM 202 over the data bus DATA, the microcontroller M arbitrates access to the data bus DATA between the DRAM 200 and ROM 202. Other components which may be incorporated into the system $S_1$ have been omitted for clarity.

In accordance with the present invention, a DRAM address bus DRAM_ADD and DRAM control bus DRAM_CTL are provided between the microcontroller M and the DRAM 200, and a ROM address bus ROM_ADD and a ROM control bus ROM_CTL are provided between the microcontroller M and the ROM 202. Address bus and control bus functions for the DRAM 200 thus are independent of the address bus and control functions for the ROM 202. In this way, a DRAM address cycle and a ROM address cycle may be overlapped, and a DRAM control cycle and a ROM control cycle may be overlapped.

Both the DRAM 200 and the ROM 202 may include counters, data registers, multiplexers, buffers, address latches, address registers, and other circuitry typical of a standard memory device. The DRAM address bus DRAM_ADD and ROM address bus ROM_ADD may include signal lines typical of a standard memory address bus (e.g., row address strobe line, column address strobe line, or address valid line). The DRAM control bus DRAM_CTL and ROM control bus ROM_CTL may include signal lines typical of a standard memory control bus (e.g., chip select line, chip enable line, read strobe line, write strobe line, output enable line, and write enable line). The DRAM address bus DRAM_ADD, ROM address bus ROM_ADD, DRAM control bus DRAM_CTL and ROM control bus ROM_CTL may be asynchronous or may be synchronized to a system clock.

Figure 2B:
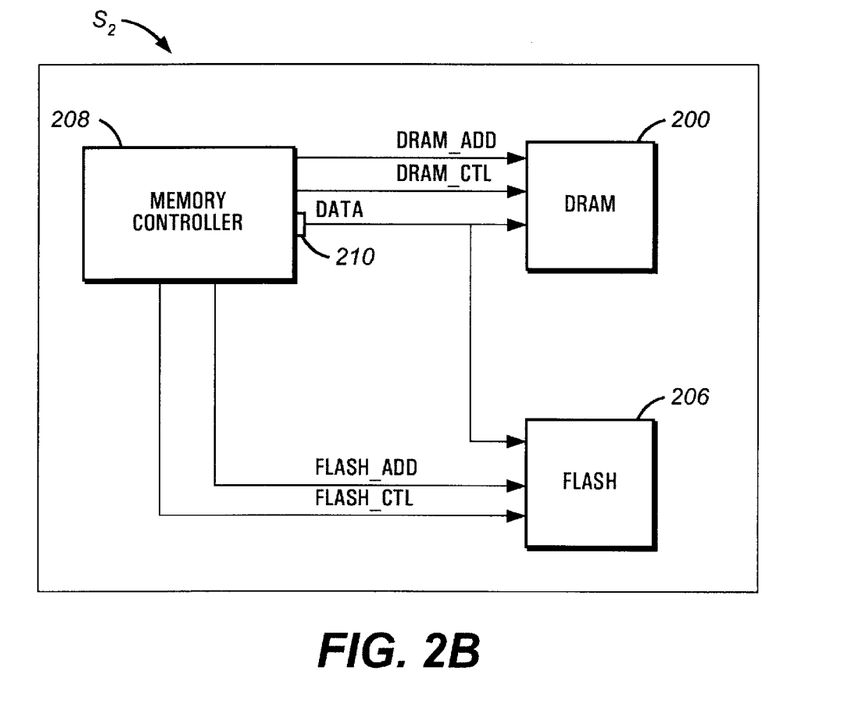
FIG. 2B is a schematic diagram of an exemplary system including the memory controller of FIG. 1, a DRAM, a flash memory, and separate memory address buses in accordance with the present invention.

Referring to FIG. 2B, an exemplary system $S_2$ in accordance with the present invention is shown. The system $S_2$ includes a memory controller 208, the DRAM 200, and a flash memory 206. Like the DRAM 200, the flash memory device 206 may include circuitry typical of a standard memory device. The memory controller 208 controls access to the DRAM 200 and the flash memory 206. While in FIG. 2A the DRAM 200 and ROM 202 share the data bus DATA, for this system $S_2$, the DRAM 200 and flash memory 206 share the data bus DATA. The memory controller 208 is coupled to the data bus DATA through signal pins 210 shared by the DRAM 200 and flash memory 206. Since access to the DRAM 200 over the data bus DATA is mutually exclusive with access to the flash memory 206 over the data bus DATA, the memory controller 208 arbitrates access to the data bus DATA between the DRAM 200 and flash memory 206. For a flash memory access cycle, data transfer occurs over the data bus DATA between the memory controller 208 and the flash memory 206.

In accordance with the present invention, a DRAM address bus DRAM_ADD and a DRAM control bus DRAM_CTL are provided between the memory controller 208 and the DRAM 200 and a flash memory address bus FLASH_ADD and flash memory control bus FLASH_CTL are provided between the memory controller 208 and the flash memory 206. Address bus and control bus functions for the DRAM 200 thus are independent of address bus and control bus functions for the flash memory 206. In this way, the DRAM address cycle and a flash memory address cycle may be overlapped and a DRAM control cycle and a flash memory control cycle may be overlapped. Like the DRAM address bus DRAM_ADD, the flash memory address bus FLASH_ADD may include signal lines typical of a standard memory address bus. Like the DRAM control bus DRAM_CTL, the flash memory control bus FLASH_CTL may include signal lines typical of a standard memory control bus. While FIGS. 2A and 2B illustrate a DRAM, ROM and flash memory, it should be understood that the techniques according to the present invention are applicable to any system providing non-volatile memory and volatile memory. Also, while FIGS. 2A and 2B illustrate a microcontroller and memory controller, it should be understood that techniques according to the present invention are applicable to other bus masters as well.

Figure 3A:
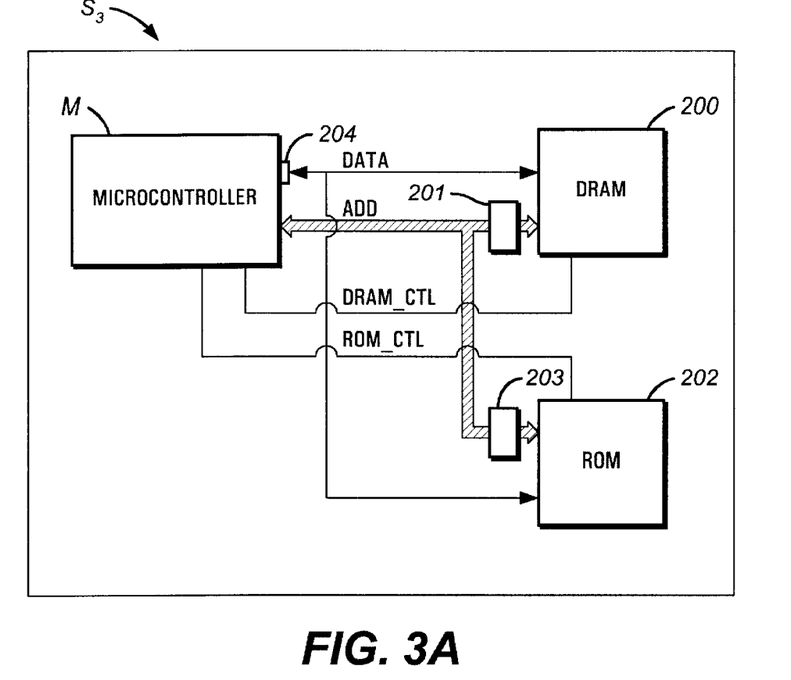
FIG. 3A is a schematic diagram of an exemplary system including the microcontroller of FIG. 1, a DRAM, a ROM, and a multiplexed memory address bus in accordance with the present invention.

Referring to FIG. 3A, an exemplary system $S_3$ in accordance with the present invention is shown. Like the system $S_1$, the system $S_3$ includes the microcontroller M, the DRAM 200, and the ROM 202; the microcontroller M controls access to the DRAM 200 and ROM 202; the DRAM 200 and ROM 202 share the data bus DATA coupled to the microcontroller M; the microcontroller M is coupled to the data bus DATA through signal pins 204 shared by the DRAM 200 and ROM 202; and the microcontroller M arbitrates access to the data bus DATA between the DRAM 200 and ROM 202.

In accordance with the present invention, a time multiplexed address bus ADD coupled to the microcontroller M is shared by the DRAM 200 and ROM 202. The time multiplexed address bus ADD permits a DRAM address cycle and a ROM address cycle to be overlapped.

The multiplexed address bus ADD may provide a multiplexed mode and a non-multiplexed mode. When a request for one memory device (e.g., DRAM or ROM) is received during an access cycle of another memory device (e.g., ROM or DRAM), the multiplexed address bus ADD may enter in a multiplexed mode. In the multiplexed mode, address signals for one memory device and address signals for another memory device are alternated at a predetermined rate. In the non-multiplexed mode, address signals for one memory device are provided.

A DRAM address latch 201 is provided between the multiplexed address bus ADD and the DRAM 200. The DRAM address latch 201 continuously watches for address information from the multiplexed address bus ADD and passes the address information to the DRAM 200. When address information is available for the DRAM 200, the DRAM address latch 201 is "open." When address information is not available for the DRAM 200, the DRAM address latch 201 is "closed." A ROM address latch 203 is provided between the multiplexed address bus ADD and the ROM 202. The ROM address latch 203 continuously watches for address information from the multiplexed address bus ADD and passes the address information to the ROM 202. When address information is available for the ROM 202, the ROM address latch 203 is "open." When address information is not available for the ROM 202, the ROM address latch 203 is "closed."

A DRAM control bus DRAM_CTL is provided between the microcontroller M and the DRAM 200, and a ROM control bus ROM_CTL is provided between the microcontroller M and the ROM 202. Control bus functions for the DRAM 200 thus are independent from control bus functions for the ROM 202. The DRAM control bus DRAM_CTL may include typical DRAM control signals such as a RAS signal and a CAS signal, and the ROM control bus ROM_CTL may include typical ROM control signals such as chip select, read, and write signals.

Figure 3B:
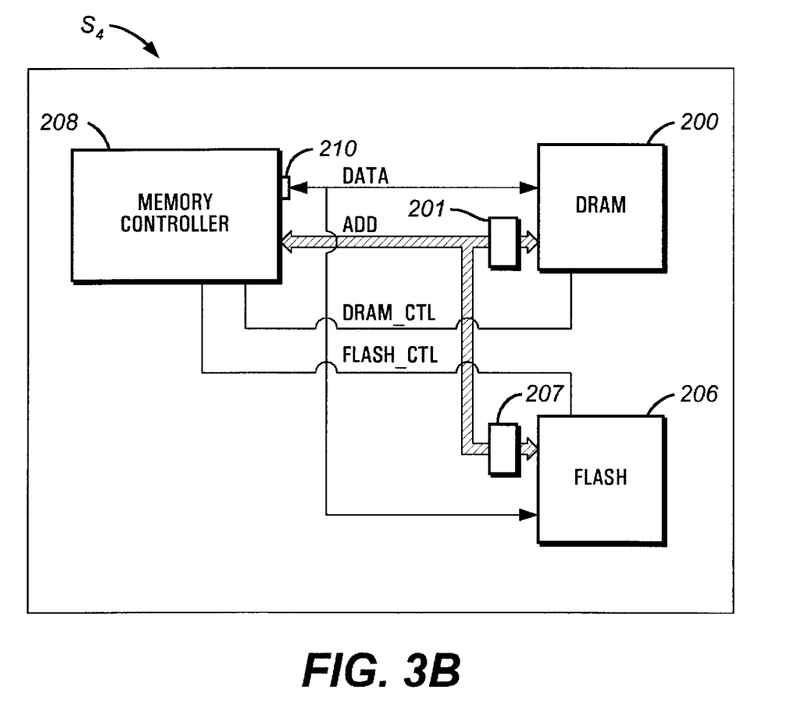
FIG. 3B is a schematic diagram of an exemplary system including the memory controller of FIG. 1, a DRAM, a flash memory, and a multiplexed memory address bus in accordance with the present invention.

Referring to FIG. 3B, an exemplary system $S_4$ in accordance with the present invention is shown. Like the system $S_2$, the system $S_4$ includes a memory controller 208, the DRAM 200, and the flash memory 206; the memory controller 208 controls access to the DRAM 200 and the flash memory 206; the DRAM 200 and flash memory 206 share the data bus DATA coupled to the memory controller 208; the memory controller 208 is coupled to the data bus DATA through signal pins 210 shared by the DRAM 200 and flash memory 206; and the memory controller arbitrates access to the data bus DATA between the DRAM 200 and the flash memory 206.

In accordance with the present invention, a time multiplexed address bus ADD coupled to the memory controller 208 is shared by the DRAM 200 and flash memory 206, and a time multiplexed control bus CTL coupled to the memory controller 208 is shared by the DRAM 200 and flash memory 206. The time multiplexed address bus ADD permits a DRAM address cycle and a flash memory address cycle to be overlapped.

The multiplexed address bus ADD may provide a multiplexed mode and a non-multiplexed mode. When a request for one memory device (e.g., DRAM or flash memory) is received during an access cycle of another memory device (e.g., flash memory or DRAM), the multiplexed address bus ADD may enter in a multiplexed mode. In the multiplexed mode, address signals for one memory device and address signals for another memory device are alternated at a predetermined rate. In the nonmultiplexed mode, address signals for one memory device are provided.

A DRAM address latch 201 is provided between the multiplexed address bus ADD and the DRAM 200. The DRAM address latch 201 continuously watches for address information from the multiplexed address bus ADD and passes the address information to the DRAM 200. When address information is available for the DRAM 200, the DRAM address latch 201 is "open." When address information is not available for the DRAM 200, the DRAM address latch 201 is "closed." Flash memory address latch 207 is provided between the multiplexed address bus ADD and the flash memory 206. The flash memory address latch 207 continuously watches for address information from the multiplexed address bus ADD and passes the address information to the flash memory 206. When address information is available for the flash memory 206, the flash memory address latch 207 is "open." When address information is not available for the flash memory 206, the flash memory address latch 207 is "closed."

A DRAM control bus DRAM_CTL is provided between the memory controller 208 and the DRAM 200, and a flash memory control bus FLASH_CTL is provided between the memory controller 208 and the flash memory 206. Control bus functions for the DRAM 200 thus are independent from control bus functions for the flash memory 206. The DRAM control bus DRAM_CTL may include typical DRAM control signals, and the flash memory control bus FLASH_CTL may include typical flash memory control signals.

Figure 4:
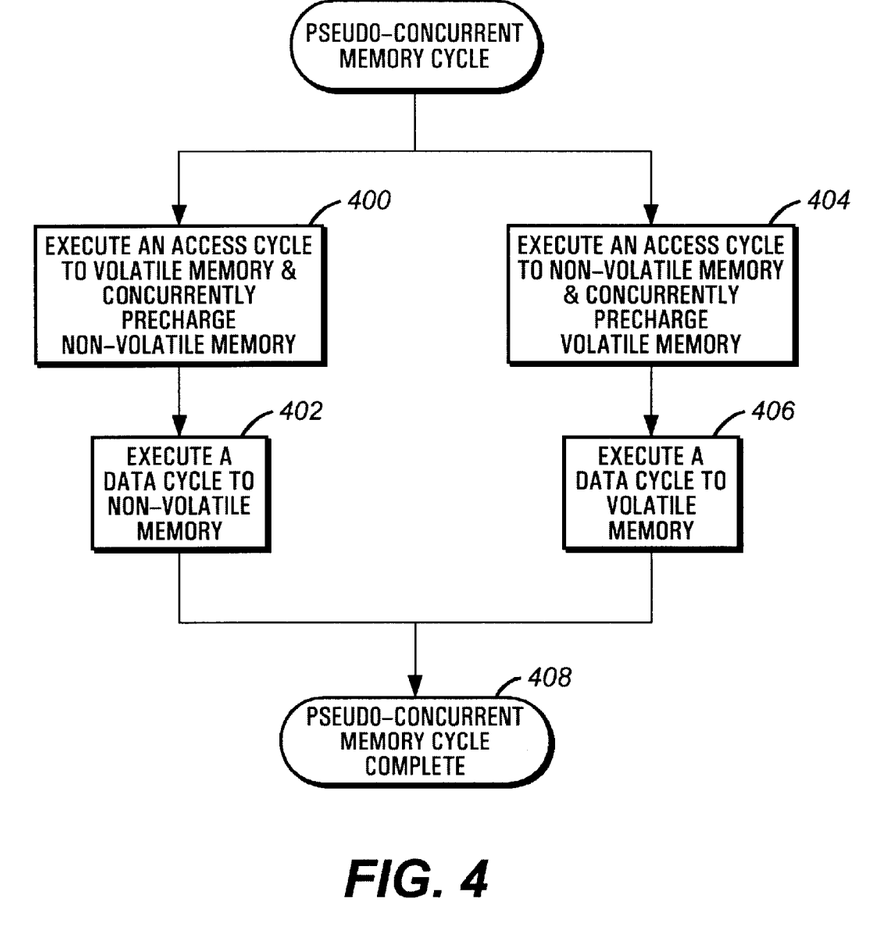
FIG. 4 is a flow chart of an exemplary pseudo-concurrent memory cycle for the systems of FIGS. 2A, 2B, 3A and 3B in accordance with the present invention.

Referring to FIG. 4, a flow chart of an exemplary pseudo-concurrent memory cycle performed by the exemplary systems of FIGS. 2A, 2B, 3A and 3B is shown. The pseudo-concurrent memory cycle may begin at either step 400 or step 404. In step 400, an access cycle to a volatile memory (e.g., DRAM) is executed, and a non-volatile memory (e.g., ROM or flash memory) is concurrently precharged. An access cycle of the volatile memory 200 includes an address cycle of the volatile memory 200 and a data cycle of the volatile memory 200. A precharge operation of the non-volatile memory 202 or 206 occurs during an address cycle of the non-volatile memory 202 or 206. An address cycle for the volatile memory 200 thus may be concurrent with the address cycle for the non-volatile memory 202 or 206. The non-volatile memory 202 or 206 may be precharged concurrent with the access cycle to the volatile memory 200 since the address cycle of the non-volatile memory 202 or 206 may be overlapped with the address cycle of the volatile memory 200 and the control cycle of the non-volatile memory 202 or 206 may be overlapped with the control cycle of the volatile memory 200. Next, in step 402, a data cycle to the non-volatile memory 202 or 206 is executed. The non-volatile memory 202 or 206 must be precharged before a data cycle to the non-volatile memory 202 or 206 may be performed. From step 402, the pseudo-concurrent memory cycle terminates through step 408.

In step 404, an access cycle to the non-volatile memory 202 or 206 is executed and a volatile memory 200 is concurrently precharged. An access cycle of non-volatile memory 202 or 206 includes an address cycle and a data cycle. A precharged operation of the volatile memory 200 (e.g., CAS precharge or RAS precharge) occurs during an address cycle of the volatile memory 200. An address cycle for the non-volatile memory 202 or 206 thus may be concurrent with the address cycle for the volatile memory 200. The volatile memory 200 may be precharged concurrent with an access cycle to the non-volatile memory 202 or 206 since the address cycle of the non-volatile memory 202 or 206 may be overlapped with the address cycle of the memory 200, and the control cycle of the non-volatile memory 202 or 206 may be overlapped with the control cycle of the volatile memory 200. Next, in step 406, a data cycle to the volatile memory 200 is executed. The volatile memory 200 must be precharged before a data cycle to the volatile memory 200 may be performed. From step 406, the pseudo-concurrent memory cycle terminates through step 408.

Figure 5:
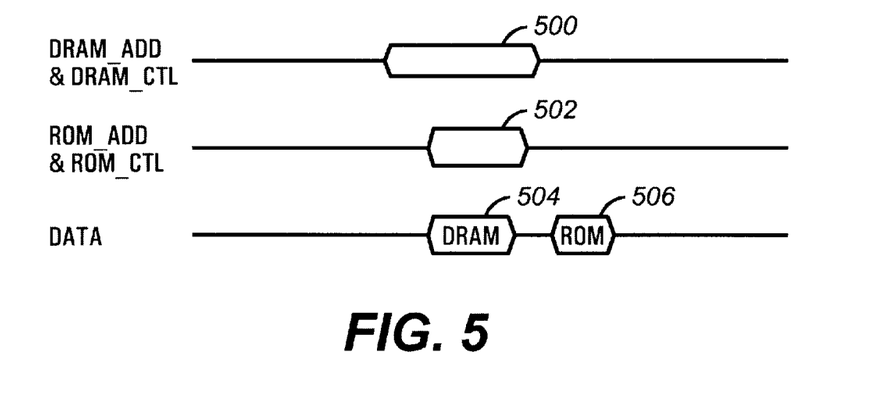
FIG. 5 is a simplified timing diagram of an exemplary pseudo-concurrent memory cycle for the systems of FIGS. 2A, 2B, 3A, and 3B in accordance with the present invention.

Referring to FIG. 5, a simplified timing diagram of an exemplary pseudo-concurrent memory cycle is shown. As illustrated, an address and control cycle 500 of the DRAM address bus DRAM_ADD and the DRAM control bus DRAM_CTL may be concurrent with an address and control cycle 502 of the ROM address bus ROM_ADD and ROM control bus ROM_CTL. That is, one address and control cycle (DRAM or ROM) may begin and before that cycle ends, the other address and control cycle (ROM or DRAM) begins. The DRAM address and control cycle 500 includes the DRAM address cycle and the DRAM control cycle. The ROM address and control cycle 502 includes the ROM address cycle and the ROM control cycle. The DRAM address and control cycle 500 and the ROM address and control cycle 502 may or may not include a precharging operation. The DRAM address and control cycle 500 and the ROM address and control cycle 502 are illustrated in an exemplary overlapped relationship. It should be understood that the percentage of overlapping between the two cycles may vary.

By providing the DRAM address and control cycle 500 and the ROM address and control cycle concurrently, data for one memory device is driven to the data bus DATA soon after driving of data for the other memory device to the data bus DATA is completed. As an example, a ROM data cycle 506 corresponding to the ROM address and control cycle 502 is illustrated as beginning after completion of a DRAM data cycle 504 corresponding to the DRAM address and control cycle 500.

The timing of the DRAM address and control cycle 500 and the timing of the ROM address and control cycle 502 are configured to ensure that the ROM data cycle 506 is not concurrent with the DRAM data cycle 504. As an example, the output enables of the DRAM 200 and ROM 202 may be appropriately set to avoid contention for the data bus DATA by the DRAM 200 and ROM 202. The appropriate time for asserting an output enable for either memory device is dependent upon a number of factors such as precharge time of the memory device, whether precharge is necessary, and the timing of the memory device. While FIG. 5 is illustrated in the context of the DRAM 200 and ROM 202, it should be understood that a pseudo-concurrent memory cycle is applicable to any volatile memory and non-volatile memory. Throughout this disclosure, references to DRAM are equally applicable to other types of volatile memory, and references to flash memory and ROM are equally applicable to other types of non-volatile memory.

Thus, the present invention provides pseudo-concurrency (or a degree of concurrency) for a volatile memory and a non-volatile memory on a same data bus. Pseudo-concurrency is achieved by adjusting the timing of address and control buses for volatile memory and non-volatile memory so that data for volatile memory and non-volatile memory are driven at the appropriate times. As a result, the present invention reduces bus latency and wait states that have come to be expected of a system providing volatile memory and non-volatile memory on a same data bus. Further, by sharing of signal pins between non-volatile memory and volatile memory, system designers are better able to simplify their designs.

The foregoing disclosure and description of the invention are illustrative and explanatory thereof, and various changes in the components, memory elements, circuit elements, signals, wiring connections and contacts, as well as in the details of the illustrated circuitry and construction and method of operation may be made without departing from the spirit of the invention.

What is claimed is:

1. A system for operating a volatile memory and a non-volatile memory on a same data bus with pseudo-concurrency, comprising:
   a data bus;
   a processor coupled to the data bus;
   a volatile memory coupled to the data bus;
   a non-volatile memory coupled to the data bus;
   a first address bus coupled to the volatile memory; and
   a second address bus coupled to the non-volatile memory.

2. The system of claim 1, further comprising:
   a first control bus coupled to the volatile memory; and
   a second control bus coupled to the non-volatile memory.

3. The system of claim 1, further comprising:
   a bus master coupled to the data bus, the first address bus, and the second address bus.

4. The system of claim 3, wherein the bus master executes an access cycle to the volatile memory and concurrently precharges the non-volatile memory.

5. The system of claim 4, wherein the bus master executes a data cycle to the non-volatile memory after executing an access cycle to the volatile memory.

6. The system of claim 3, wherein the bus master executes an access cycle to the non-volatile memory and concurrently precharges the volatile memory.

7. The system of claim 6, wherein the bus master executes a data cycle to the volatile memory after executing an access cycle to the non-volatile memory.

8. The system of claim 6, wherein the bus master is a microcontroller.

9. The system of claim 1, wherein the data bus is a relatively fast bus.

10. A system for operating a volatile memory and a non-volatile memory on a same data bus with pseudo-concurrency, comprising:
    a data bus;
    a processor coupled to the data bus;
    a volatile memory coupled to the data bus;
    a non-volatile memory coupled to the data bus;
    a first control bus coupled to the volatile memory;
    a second control bus coupled to the non-volatile memory; and
    a multiplexed address bus coupled to the volatile memory and the non-volatile memory.

11. A system for operating a volatile memory and a non-volatile memory on a same data bus with pseudo-concurrency, comprising:
    a data bus;
    a processor coupled to the data bus;
    a volatile memory coupled to the data bus;
    a non-volatile memory coupled to the data bus;
    a bus master coupled to the data bus and the multiplexed address bus; and
    a multiplexed address bus coupled to the volatile memory and the non-volatile memory,
    wherein the bus master executes an access cycle to the volatile memory and concurrently precharges the non-volatile memory.

12. The system of claim 11, wherein the bus master executes a data cycle to the non-volatile memory after executing an access cycle to the volatile memory.

13. A system for operating a volatile memory and a non-volatile memory on a same data bus with pseudo-concurrency, comprising:
    a data bus;
    a processor coupled to the data bus;
    a volatile memory coupled to the data bus;
    a non-volatile memory coupled to the data bus;
    a bus master coupled to the data bus and the multiplexed address bus; and
    a multiplexed address bus coupled to the volatile memory and the non-volatile memory,
    wherein the bus master executes an access cycle to the non-volatile memory and concurrently precharges the volatile memory.

14. The system of claim 13, wherein the bus master executes a data cycle to the volatile memory after executing an access cycle to the non-volatile memory.

15. A method of operating a volatile memory and a non-volatile memory on a same data bus with pseudo-concurrency, comprising the steps of:
    providing first address information and first control information to the volatile memory;
    providing second address information and second control information to the non-volatile memory concurrent with providing first address and first control information to the volatile memory;

performing a first data cycle over a data bus for the volatile memory corresponding to the first address and control information; and performing a second data cycle over the data bus for the non-volatile memory corresponding to the second address and control information after completion of the first data cycles, wherein the first data cycle is independent of the second data cycle.

16. The method of claim 15, wherein the first address information and the second address information are provided over the same bus.

17. The method of claim 15, wherein the first address information is provided over a first bus and the second address information is provided over a second bus.

18. A method of operating a volatile memory and a non-volatile memory on a same data bus with pseudo-concurrency, comprising the steps of:

providing first address information and first control information to the non-volatile memory;

providing second address information and second control information to the volatile memory concurrent with providing first address information and first control information to the non-volatile memory;

performing a first data cycle over a data bus for the non-volatile memory corresponding to the first address and control information; and performing a second data cycle over the data bus for the volatile memory corresponding to the second address and control information after completion of the first data cycles, wherein the first data cycle is independent of the second data cycle.

19. The method of claim 18, wherein the first address information and the second address information are provided over the same bus.

20. The method of claim 18, wherein the first address information is provided over a first bus and the second address information is provided over a second bus.

* * * * *

UNITED STATES PATENT AND TRADEMARK OFFICE
CERTIFICATE OF CORRECTION

PATENT NO.    : 6,480,929 B1                                              Page 1 of 1
DATED         : November 12, 2002
INVENTOR(S)   : Gauthier et al.

It is certified that error appears in the above-identified patent and that said Letters Patent is hereby corrected as shown below:

Column 11,
Line 9, replace "cycles" with -- cycle --.

Column 12,
Line 12, replace "cycles" with -- cycle' --.

Signed and Sealed this

Twenty-second Day of April, 2003

JAMES E. ROGAN
*Director of the United States Patent and Trademark Office*